United States Patent
Zhou et al.

(10) Patent No.: US 9,235,985 B2
(45) Date of Patent: Jan. 12, 2016

(54) ELECTRONIC DEVICE AND METHOD FOR TRIGGERING FUNCTION OF ELECTRONIC DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Jian-Jun Zhou, Shenzhen (CN); Jun-Wei Zhang, Shenzhen (CN); Jun Zhang, Shenzhen (CN); Tsung-Jen Chuang, New Taipei (TW)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 327 days.

(21) Appl. No.: 13/873,113

(22) Filed: Apr. 29, 2013

(65) Prior Publication Data

US 2013/0294205 A1 Nov. 7, 2013

(30) Foreign Application Priority Data

May 4, 2012 (CN) .......................... 2012 1 1357572

(51) Int. Cl.
*G10L 15/00* (2013.01)
*H04N 5/232* (2006.01)
*H04R 29/00* (2006.01)
*G08C 19/12* (2006.01)
*G06F 3/01* (2006.01)

(52) U.S. Cl.
CPC ................ *G08C 19/12* (2013.01); *G06F 3/011* (2013.01)

(58) Field of Classification Search
CPC ................................. G10L 15/00; H04N 5/232
USPC ............. 340/5.82, 5.84; 179/15; 381/56, 110; 704/275, 270, 233, 214, 217
See application file for complete search history.

(56) References Cited

U.S. PATENT DOCUMENTS

| | | | | | |
|---|---|---|---|---|---|
| 4,052,568 | A | * | 10/1977 | Jankowski | 704/233 |
| 4,670,864 | A | * | 6/1987 | Hoffmann | 367/198 |
| 5,488,273 | A | * | 1/1996 | Chang | 318/16 |
| 6,131,044 | A | * | 10/2000 | Ryu | 455/563 |
| 7,120,257 | B2 | * | 10/2006 | Mahoney | 381/56 |
| 7,415,416 | B2 | * | 8/2008 | Rees | 704/275 |
| 7,418,392 | B1 | * | 8/2008 | Mozer et al. | 704/275 |
| 7,525,575 | B2 | * | 4/2009 | Rees et al. | 348/211.99 |
| 7,801,726 | B2 | * | 9/2010 | Ariu | 704/243 |
| 8,564,681 | B2 | * | 10/2013 | Yamamoto | 348/222.1 |
| 8,781,821 | B2 | * | 7/2014 | Newman | 704/214 |

* cited by examiner

*Primary Examiner* — Nam V Nguyen
(74) *Attorney, Agent, or Firm* — Novak Druce Connolly Bove + Quigg LLP

(57) ABSTRACT

An electronic device includes a sound collecting unit and a processor. The processor determine whether continuous sound signals collected by the sound collecting unit includes a first alternating portion, a direct portion, and a second alternating portion in sequence. The processor further determines whether a first duration of the direction signals portion falls within a first preset time range, and determines whether a second duration of each of the first alternating portion and the second alternating portion falls within a second preset time range. The processor then triggers a function of the electronic device when the first duration falls within the first preset time range, and the second duration falls within the second preset time range. A related method is also disclosed.

8 Claims, 3 Drawing Sheets

ELECTRONIC DEVICE AND METHOD FOR TRIGGERING FUNCTION OF ELECTRONIC DEVICE

BACKGROUND

1. Technical Field

The present disclosure relates to electronic devices, and particularly to an electronic device and a method for triggering a function of the electronic device.

2. Description of Related Art

Today's human-machine interface of electronic devices is still strongly relying on key or touch key interaction. However, in many situations such interaction may be difficult since one hand of the user has to hold the device while the other hand may not be free either to interact with the device. Hence, there is a continuous interest to simplify and extend the ways of interacting with electronic devices.

BRIEF DESCRIPTION OF THE DRAWINGS

Many aspects of the present disclosure should be better understood with reference to the following drawings. The units in the drawings are not necessarily drawn to scale, the emphasis instead being placed upon clearly illustrating the principles of the present disclosure. Moreover, in the drawings, like reference numerals designate corresponding portions throughout the several views.

DETAILED DESCRIPTION

Embodiments of the present disclosure will now be described in detail, with reference to the accompanying drawings.

Figure 1:
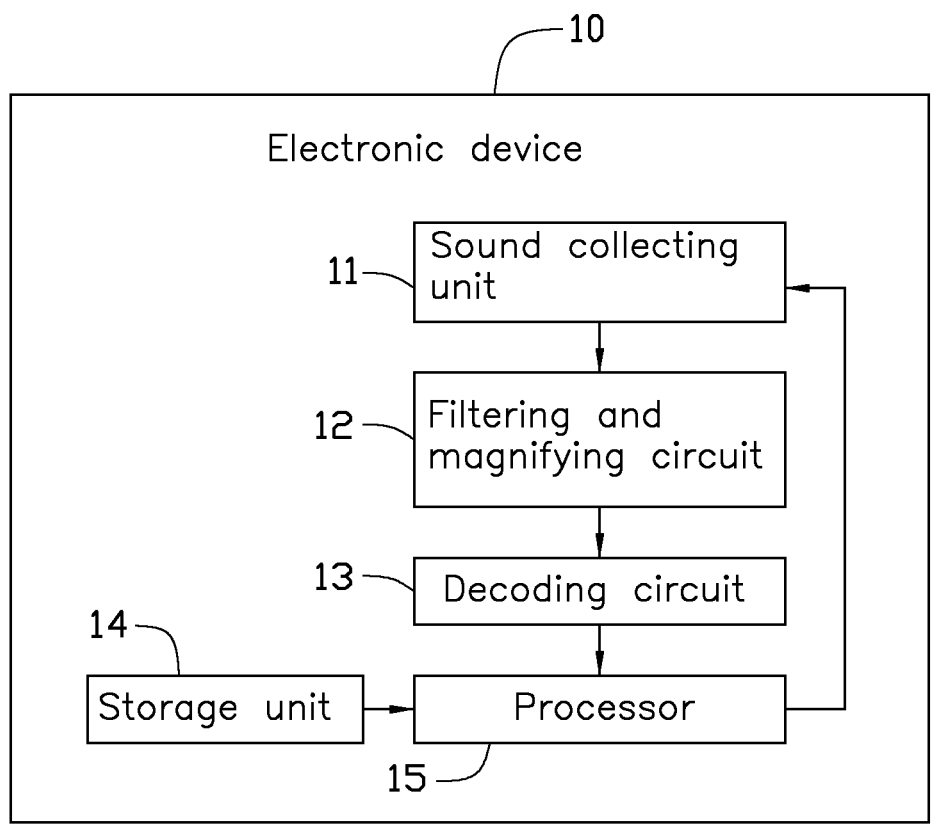
FIG. 1 is a block diagram of an electronic device, in accordance with an exemplary embodiment.
Figure 2:
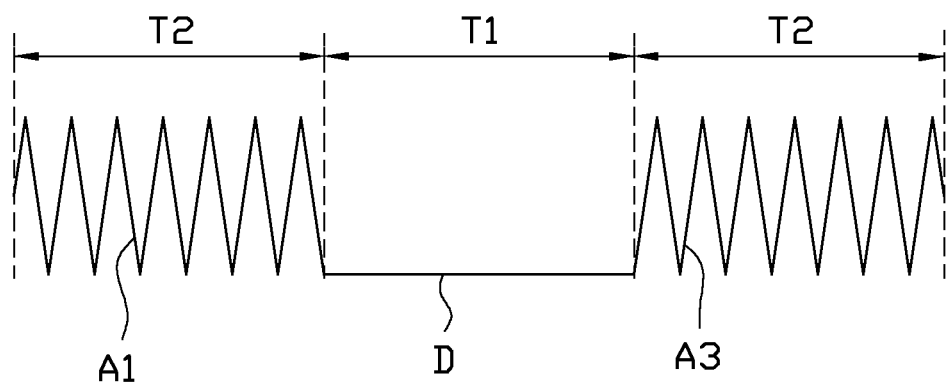
FIG. 2 is a schematic view of detection signals for triggering a function of the electronic device of FIG. 1, in accordance with an exemplary embodiment.

FIG. 1 shows an electronic device 10 controlled by an exhalation of an air stream to execute a preset function. The electronic device 10 may be a smart phone, a laptop computer, or a tablet computer. The electronic device 10 includes a sound collecting unit 11, a filtering and magnifying circuit 12, a decoding circuit 13, a storage unit 14, and a processor 15. The sound collecting unit 11 collects ambient sound signals. The sound collecting unit 11 may be a microphone. The filtering and magnifying circuit 12 filters and magnifies the collected sound signals. The decoding circuit 13 decodes the magnified sound signals. The processor 15 determines whether the decoded sound signals include a first alternating portion A1, a direct portion D, and a second alternating portion A3 in sequence (see FIG. 2), and determines whether a first duration of the direct portion falls within a first preset time range T1, and whether a second duration of each of the first alternating portion and the second alternating portion falls within a second preset time range T2. When the first duration falls within the first preset time range T1, and the second duration falls within the second preset time range T2, the processor 15 triggers a function of the electronic device 10, for example, answering an incoming call.

In this embodiment, the first alternating portion Al and the second alternating portion are generated when a human being exhales. The duration of the direct portion indicates an interval between two exhalations. The first preset time range T1 may be 100 ms~2.5 s or 200 ms~500 ms. The second preset time range T2 may be 100 ms~2.5 s or 200 ms~500 ms.

Furthermore, to avoid error determination, the processor 15 further determines whether a frequency of alternating signals of each of the first alternating portion and the second alternating portion is greater than a preset value when the second duration falls within the second preset time range T2. If the frequency is greater than the preset value, the processor 15 triggers a function of the electronic device 10. The preset value may be 300 Hz or 800 Hz.

In an alternative embodiment, the storage unit 14 stores reference signals. The reference signals can be preset by users. The reference signals include a first reference alternating portion, a reference direct portion, and a second reference alternating portion. The processor 15 determines whether a first difference between durations of the reference direct portion and the direct portion falls within a first preset range, whether a second difference between durations of the first reference alternating portion and the first alternating portion falls within a second preset range, and whether a third difference between durations of the second reference alternating portion and the second alternating portion falls within the second preset range. The processor 15 triggers a function of the electronic device 10 when the first difference falls within the first preset range, and the second difference and the third difference falls within the second preset range. To avoid error determination, in the alternative embodiment, the processor 15 further determines whether a first frequency difference between the first reference alternating portion and the first alternating portion falls within a preset frequency range, and whether a second frequency difference between the second reference alternating portion and the second alternating portion falls within the preset frequency range. The processor 15 triggers a function of the electronic device when the first frequency difference and the second frequency difference fall within the preset frequency range.

With such configuration, a function of the electronic device 10 can be triggered without using hands.

Figure 3:
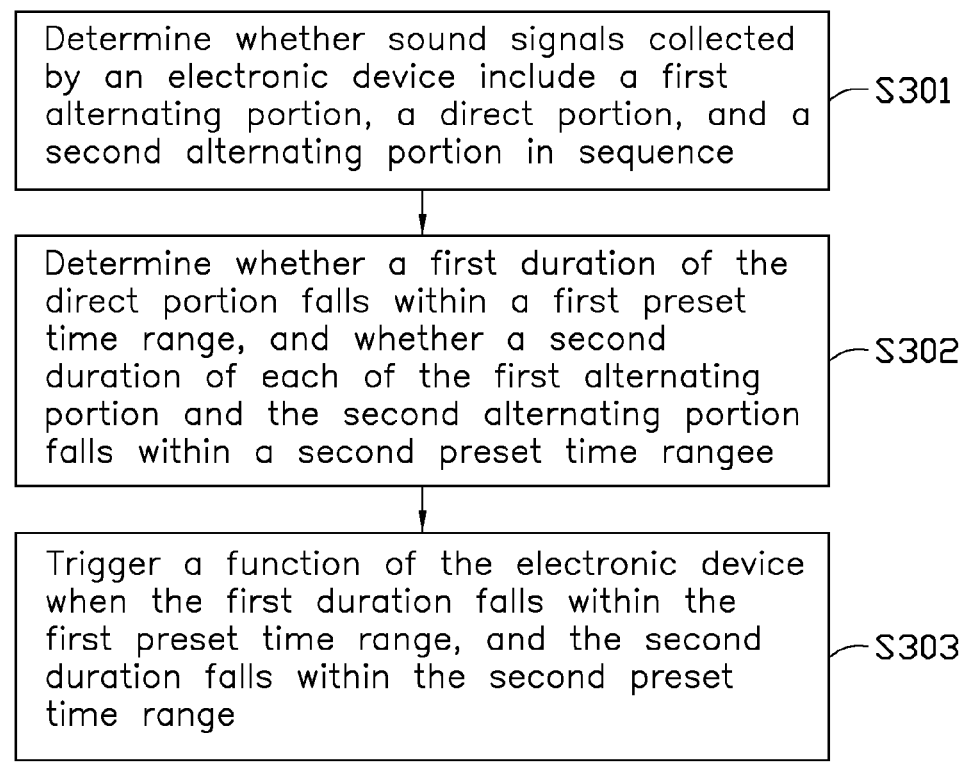
FIG. 3 is a flowchart of a method for triggering a function of the electronic device of FIG. 1, in accordance with an exemplary embodiment.

FIG. 3 is a flowchart of a method for triggering a function of the electronic device 10, in accordance with an exemplary embodiment.

In step S301, the processor 15 determines whether collected sound signals include a first alternating portion, a direct portion, and a second alternating portion in sequence.

In step S302, if the collected sound signals include a first alternating portion, a direct portion, and a second alternating portion in sequence, the processor 15 determines whether a first duration of the direct portion falls within the first preset time range T1, and whether a second duration of each of the first alternating portion and the second alternating portion falls within the second preset time range T2.

In step S303, when the first duration falls within the first preset time range T1, and the second duration falls within the second preset time range T2, the processor 15 triggers a function of the electronic device 10.

Furthermore, to avoid error determination, the processor 15 further determines whether a frequency of alternating signals of each of the first alternating portion and the second alternating portion is greater than the preset value when the second duration falls within the second preset time range T2. If the frequency is greater than the preset value, the processor 15 triggers a function of the electronic device 10.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. An electronic device comprising:
   a sound collecting unit; and
   a processor to determine whether sound signals collected by the sound collecting unit comprises a first portion, a second portion, and a third portion in sequence in a continuous time period, the first portion and the third portion being generated when a human being exhales: the processor further to determine whether a first duration of the second portion falls within a first preset time range, wherein the first duration of the second portion indicates an interval between two exhalations; the processor further to determine whether a second duration of each of the first portion and the third portion falls within a second preset time range, and further to determine whether a frequency of each of the first portion and the third portion is greater than 300Hz when the second duration falls within the second preset time range, a function of the electronic device being triggered when the first duration falls within the first preset time range, and when the second duration falls within the second preset time range, and the frequency of each of the first portion and the third portion being greater than 300Hz.

2. The electronic device as described in claim 1, wherein the first preset time range is 100ms~2.5s, and the second preset time range is 100ms~2.5s.

3. The electronic device as described in claim 1, wherein the first preset time range is 200ms~500ms, and the second preset time range is 200ms~500ms.

4. The electronic device as described in claim 1, further comprising:
   a filtering and magnifying circuit to filter and magnify the sound signals collected by the sound collecting unit; and
   a decoding circuit to decode the magnified sound signals and output the decoded sound signals to the processor.

5. An electronic device comprising:
   a sound collecting trait;
   a storage unit to store reference signals, the reference signals comprising a. first reference portion, a second reference portion, and a third reference portion in sequence; and
   a processor to determine whether sound signals collected by the sound collecting unit comprises a first portion, a second portion, and a third portion in sequence in a continuous time period, the first portion and the third portion being generated when a human being exhales, the processor further to determine whether a first difference between durations of the second reference portion and the second portion falls within a first preset time range, whether a second difference between durations of the first reference portion and the first portion falls within a second preset time range, and whether a third difference between durations of the third reference portion and the third portion falls within the second preset time range, wherein the duration of the second portion indicates an interval between two exhalations; and a function of the electronic device being triggered when the first difference falls within the first preset time range, the second difference and the third difference each fall within the second preset time range; and
   wherein the processor is further to determine whether a first frequency difference between the first reference portion and the first portion falls within a preset frequency range, and whether a second frequency difference between the third reference portion and the third portion falls within the preset frequency range: and trigger the function of the electronic device when the first frequency difference and the second frequency difference fall within the preset frequency range.

6. A method for triggering a function of an electronic device, the electronic device comprising a sound collecting unit, the method comprising:
   determining whether sound signals collected by the sound collecting unit comprises a first portion, a second portion, and a third portion in sequence in a continuous time period;
   determining whether a first duration of the second portion falls within a first preset time range, and whether a second duration of each of the first portion and the third portion falls within a second preset time range;
   determining whether a frequency of each of the first portion and the third portion is greater than 300Hz when the second duration falls within the second preset time range; and
   triggering a function of the electronic device when the first duration falls within the first preset time range and the second duration falls within the second preset time range, and when the frequency of each of the first portion and the third portion is greater than 300Hz.

7. The method as described in claim 6, wherein the first preset time range is 100ms~2.5s, and the second preset time range is 100ms~2.5s.

8. The method as described in claim 6, wherein the first preset time range is 200ms~500ms, and the second preset time range is 200ms~500ms.

* * * * *